Sept. 17, 1968 G. E. CLARRIDGE 3,402,267
AUTOMATIC WINDUP FIXTURE FOR TELEPHONE DIAL
Filed Dec. 1, 1965 5 Sheets-Sheet 1
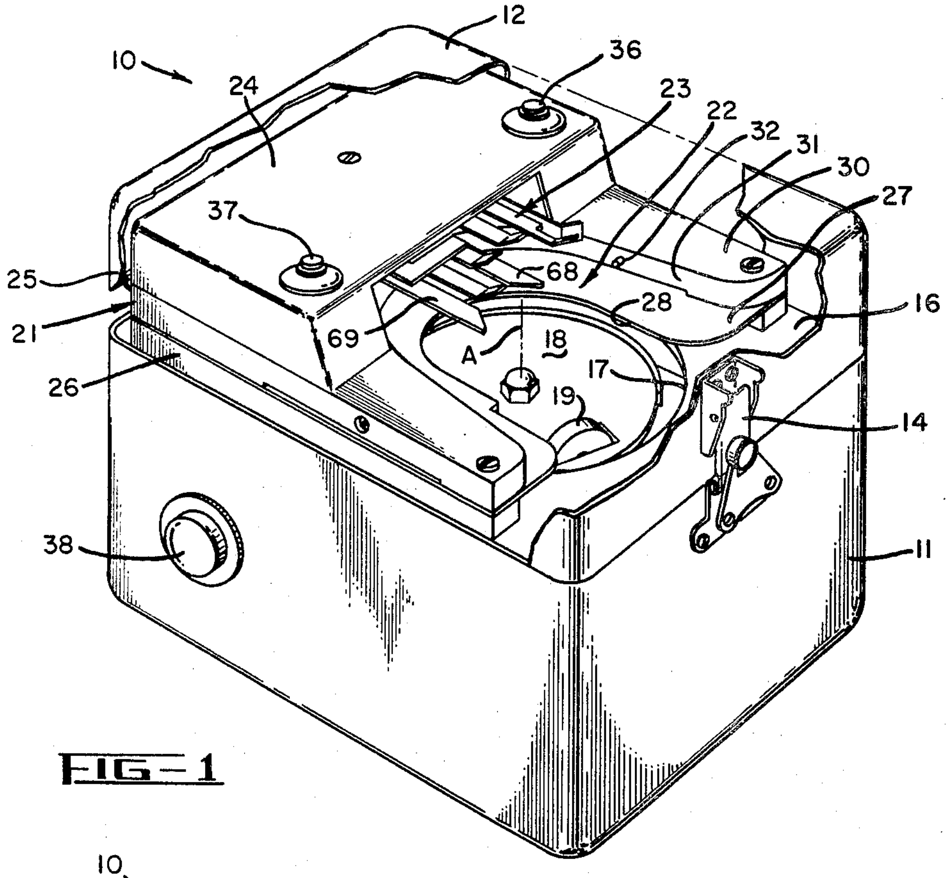
FIG-1
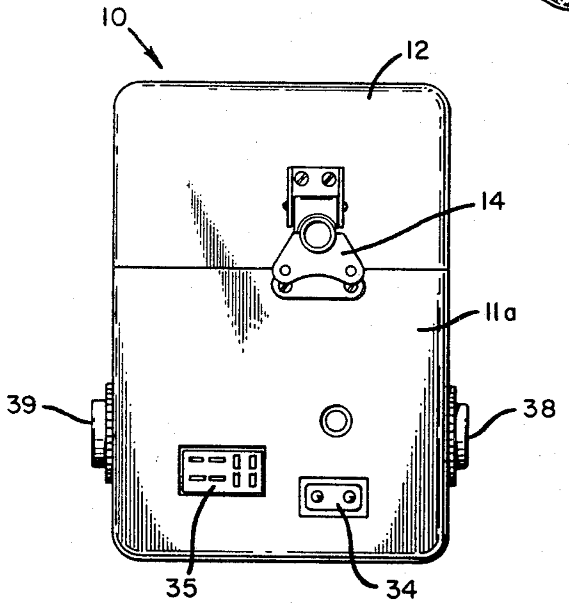
FIG-1-A
INVENTOR.
GLENN E. CLARRIDGE
BY John F. Lawler
ATTORNEY INVENTOR.
GLENN E. CLARRIDGE
BY John F. Lawler
ATTORNEY INVENTOR
GLENN E. CLARRIDGE
BY John F. Lawler
ATTORNEY Sept. 17, 1968 G. E. CLARRIDGE 3,402,267

AUTOMATIC WINDUP FIXTURE FOR TELEPHONE DIAL

Filed Dec. 1, 1965 5 Sheets-Sheet 4

INVENTOR.
GLENN E. CLARRIDGE

BY John F Lawler
ATTORNEY

Sept. 17, 1968 G. E. CLARRIDGE 3,402,267

AUTOMATIC WINDUP FIXTURE FOR TELEPHONE DIAL

Filed Dec. 1, 1965 5 Sheets-Sheet 5

INVENTOR.
GLENN E. CLARRIDGE

BY John F. Lawler

ATTORNEY

United States Patent Office 3,402,267

Patented Sept. 17, 1968

3,402,267

AUTOMATIC WINDUP FIXTURE FOR TELEPHONE DIAL

Glenn E. Clarridge, Santa Cruz, Calif., assignor to Sylvania Electric Products Inc., a corporation of Delaware Filed Dec. 1, 1965, Ser. No. 510,795
6 Claims. (Cl. 179—175.2)

This invention relates to telephone dial testing equipment, and more particularly to an automatic windup fixture for a telephone dial.

The several mechanical and electrical tests that are normally made on a telephone dial are performed by winding up and releasing the finger wheel of the dial. The number of pulses, speed of rotation, and other operating characteristics of the dial are measured while the finger wheel and other parts are actually spinning. In the past, the dial spinning procedure has been performed manually. This is not only tedious but involves awkward and time-consuming manipulation of the mechanism during setup because the finger wheel and the electrical contacts are on opposite sides. These disadvantages are magnified at field service and factory test stations which test hundreds and thousands of dials on a regular basis.

An object of this invention is the provision of a fixture which automatically winds and releases a telephone dial for testing purposes.

Another object is the provision of a dial test fixture which insures proper positioning and engagement of parts of the dial unit to permit proper electrical and mechanical contacts to be made.

A further object is the provision of a dial windup fixture which requires minimum attention and skill of the operator.

A further object is the provision of a test fixture that may be used with automatic readout equipment to test the operating characteristics of a telephone dial.

Still another object is the provision of a compact, lightweight, portable windup fixture that is equally well suited for testing dials in the field as at the factory.

These and other objects of the invention are achieved through provision of a portable automatic windup fixture which holds, electrically engages, and spins the dial of a telephone. The fixture positions and holds the dial in an inverted position so that stationary terminal fingers electrically contact the proper terminals of the inserted dial. When a start button is pressed, a crank mounted on a rotatable spin plate under the dial finger wheel makes one complete revolution, engaging a hole in the wheel at the beginning of the cycle and releasing it at the end. An eject button permits energization of a solenoid to rapidly eject the dial from the fixture. A high voltage insulation test of the dial may also be made and in a manner to provide maximum safety to the operator. The fixture is adapted to be used with appropriate test and readout equipment to provide immediate evaluation of dial performance.

Other objects of the invention will become apparent from the following description of a preferred embodiment thereof, reference being made to accompanying drawings which:

FIGURE 1 is a perspective view of an automatic windup fixture with the outer cover broken away to show details of construction;

FIGURE 1A is a rear end view of the fixture of FIGURE 1 on a reduced scale;

Figures 2, 3:
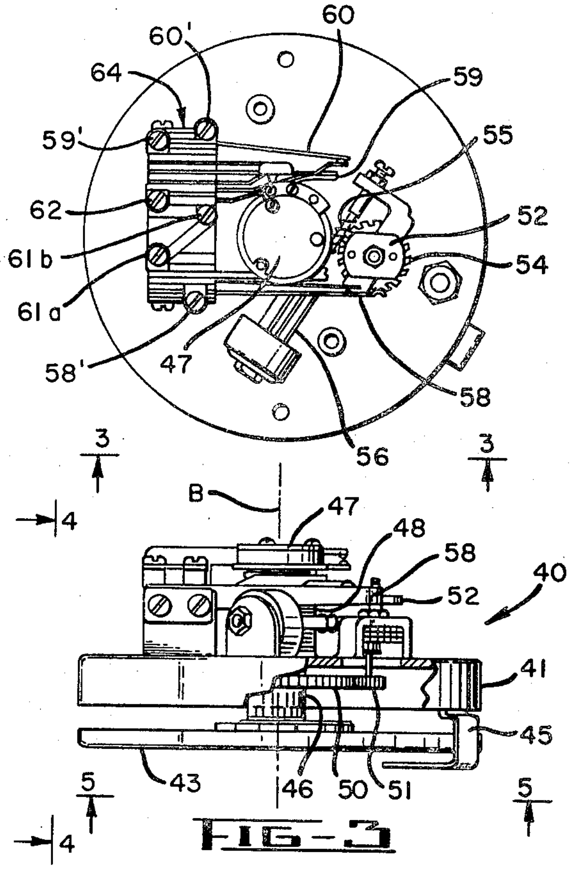
FIGURES 2–5 are views of a standard telephone dial.
Figure 4:
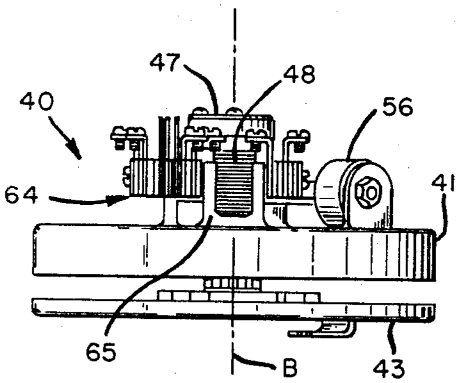
Figure 5:
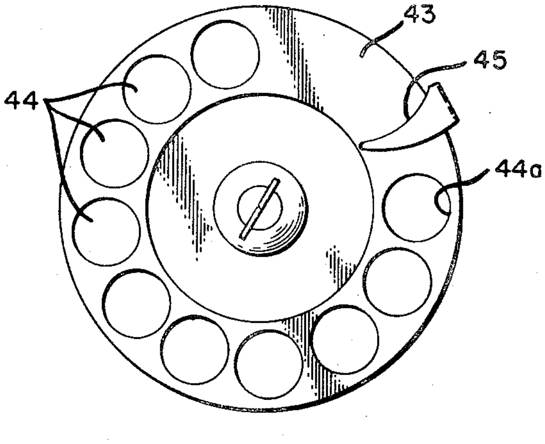

Referring now to the drawings, a preferred embodiment of the invention is shown in FIGURES 1 and 2 as a box-like unit 10 having a base housing 11 and a protective outer cover 12 secured to the housing by front and rear latches 14. The cover is removed when the unit is in use. The terms "front" and "rear" of the windup fixture refer the ends thereof to the right and left, respectively, in FIGURE 1.

Base housing 11 has a top wall 16 with a circularly-shaped opening 17 formed in the forward central part thereof. A dial spin plate 18 is located directly below and in alignment with opening 17 and has a dial wheel-engaging crank 19 mounted thereon for rotation with the plate about the axis A. Crank 19 is operative to engage the dial wheel of the dial under test as the spin plate rotates to wind the dial, and to release the dial wheel after one revolution so that the latter is free to unwind or roll back.

A dial mount subassembly 21 is secured to and projects upwardly from top wall 16 of base housing 11 and comprises a forwardly opening U-shaped holder or receptacle 22, terminal fingers 23 which project forwardly over top wall opening 17, and a terminal finger cover 24 hinged at 25 to the lower part of the subassembly. Holder 22 consists of vertically stacked parts comprising a spacer block 26, a dial support plate 27 having a curved inner edge 29, and a guide block 30 with a generally U-shaped inner surface 31 for receiving the cylindrical casing of the dial to be tested. Spring loaded friction buttons 32 project inwardly from opposite sides of guide block surface 31 to engage the dial casing and retain it in the test position. The spacing between opposite sides of the inner edge 28 of support plate 27 is substantially less than the spacing of corresponding parts of guide block surface 31 to provide a lip which extends between the dial casing and wheel and on which the dial casing is supported.

The rear wall 11A of base housing 11, see FIGURE 1–A, mounts a power line connector 34 and a signal line connector 35 for convenient attachment of the assembly to an external power source and to test equipment, respectively. Signal line connector 35 simply is an electrical extension of terminal fingers 23.

"Start" button 36 and "eject" button 37 project above terminal cover 24 for ready access by the operator to initiate operation of the dial windup mechanism and to eject the dial from the holder upon completion of the test. Two high voltage test buttons 38 and 39 on opposite sides of the housing must be depressed simultaneously in order to apply high voltage to the dial contacts, and thus the operator is purposely required to conduct this test with two hands for his own safety.

A better understanding of the structure and operation of the automatic dial windup and release assembly will be gained from the following description of a standard dial with reference to FIGURES 2–5, inclusive. The dial, which does not constitute part of this invention, is indicated at 40 and comprises a cylindrical casing 41 on which a finger wheel 43 is supported for rotation about the dial axis B. Wheel 43 has the familiar finger openings 44 and is overlapped by a finger stop 45 connected to casing 41. A coaxial shaft 46 connected to wheel 43 extends through and projects from the opposite side of the casing and is connected at its outer end to a "spotter" cam 47. A torsion windup spring 48 connected between shaft 46 and casing 41 is tensioned when finger wheel 43 is rotated and causes the wheel to roll back to its original position when the wheel is released. A gear 50, which is rotated by shaft 46 only during roll-back of the finger wheel 43, engages a pinion 51 to which an "impulse" cam 52 located outside the casing is mechanically connected. A worm wheel 54 rotated by the pinion engages a worm 55 to rotate a governor 56 which regulates (i.e., maintains constant) the speed of rotation of the parts during roll back of the dial wheel.

As impulse cam 52 rotates, it engages and cyclically opens and closes dial relay (DR) contacts 58 to which DR terminal 58′ is connected and thus generates a series of impulses indicative of the number dialed. Shunt spring (SS) 59 is connected to terminal 59′ and serves to short circuit the transmitter and receiver during dialing. Spotter spring (SP) 60 connected to terminal 60′ superimposes an additional pulse or group of pulses on the impulse train in order to identify the calling party on a multi-party line. Terminals **61*a* and 61*b* are connected to the casing 41 for dial ground and terminal 62 is a high ratio (HP) readout contact. These several terminals on the base of the dial are engaged by fingers 23 on the dial mount subassembly when the dial unit is seated for test and thus electrical connection of these dial terminals is made to external test and readout apparatus via connector 35. The laminar terminal body 64 on which the several terminals are mounted is supported on a U-shaped support 65 integral with the casing. Support 65** serves to locate and guide the dial into the proper position within the dial holder of the windup assembly.

In order to test such a dial utilizing the automatic windup fixture 10, the dial is inserted into holder 22 so that support plate 27 is located between dial casing 41 and the finger wheel 43 and the latter faces downwardly toward dial spin plate 18. The relative angular relationship of the dial casing and the holder 22 is such that U-shaped terminal body support 65 is aligned with forwardly projecting guide strips 68 and 69 as the dial unit is moved to the rear and bottoms against side surface 31 of guide block 30. Friction buttons 32 press against casing 41 to retain the dial in the test position and the several contact fingers 23 slide over and make firm electrical engagement with the several dial terminals.

When the dial is fully seated within the holder 22, its axis B is coincident with axis A of the dial spin plate 18. Depression of start button 36 energizes a motor which causes the spin plate to rotate trough 360°. Crank 19 engages the "zero" finger hole **44*a* in wheel 43, see FIGURE 5, near the beginning of this cycle and releases it near the end of the movement. The several contact fingers 23 sense and transmit signals generated by the impulse spring 58, shunt spring 59, and spotter spring 60 via signal connector 35 to the external test equipment. Depression of the high voltage test buttons 38 and 39 on the sides of the unit causes a high voltage (500 volt DC) to be impressed on the dial terminals through fingers 23 to determine the condition of the insulation and other parts. Upon completion of operational tests, eject button 37** is pressed to actuate a solenoid ejector mechanism, described below, to kick the dial forwardly from the holder for removal and replacement by another unit to be tested.

Figure 6:
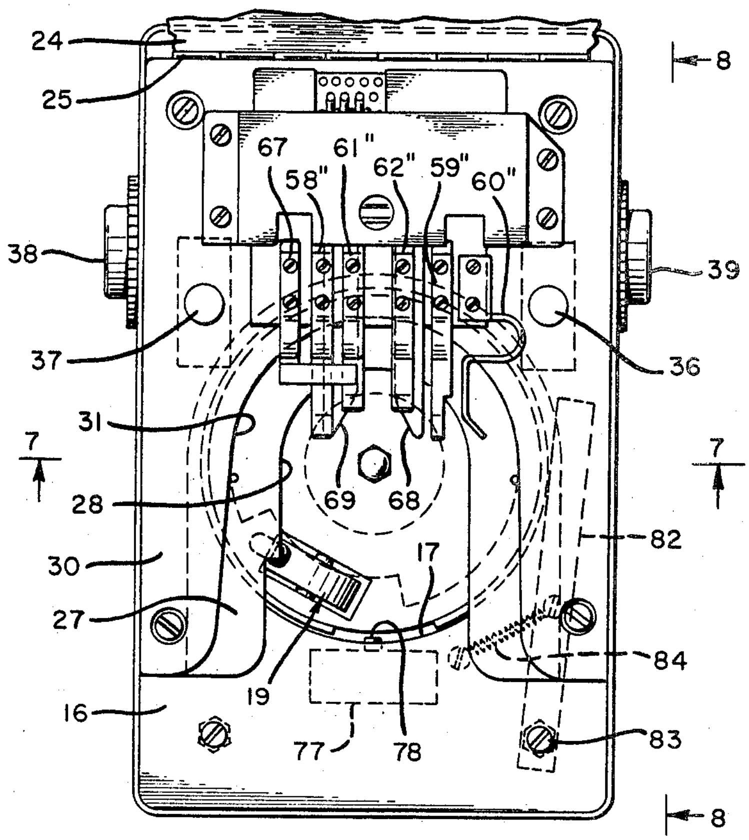
FIGURE 6 is a top plan view of the windup fixture with the outer cover removed and the inner terminal finger block cover opened.
Figure 7:
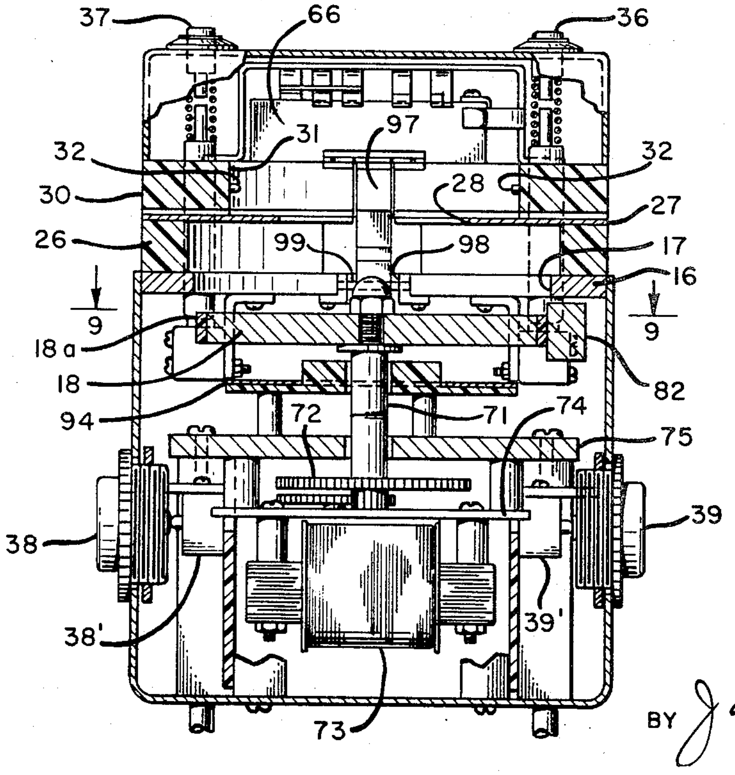
FIGURE 7 is a vertical section taken on line 7—7 of FIGURE 6.
Figures 8, 9, 10:
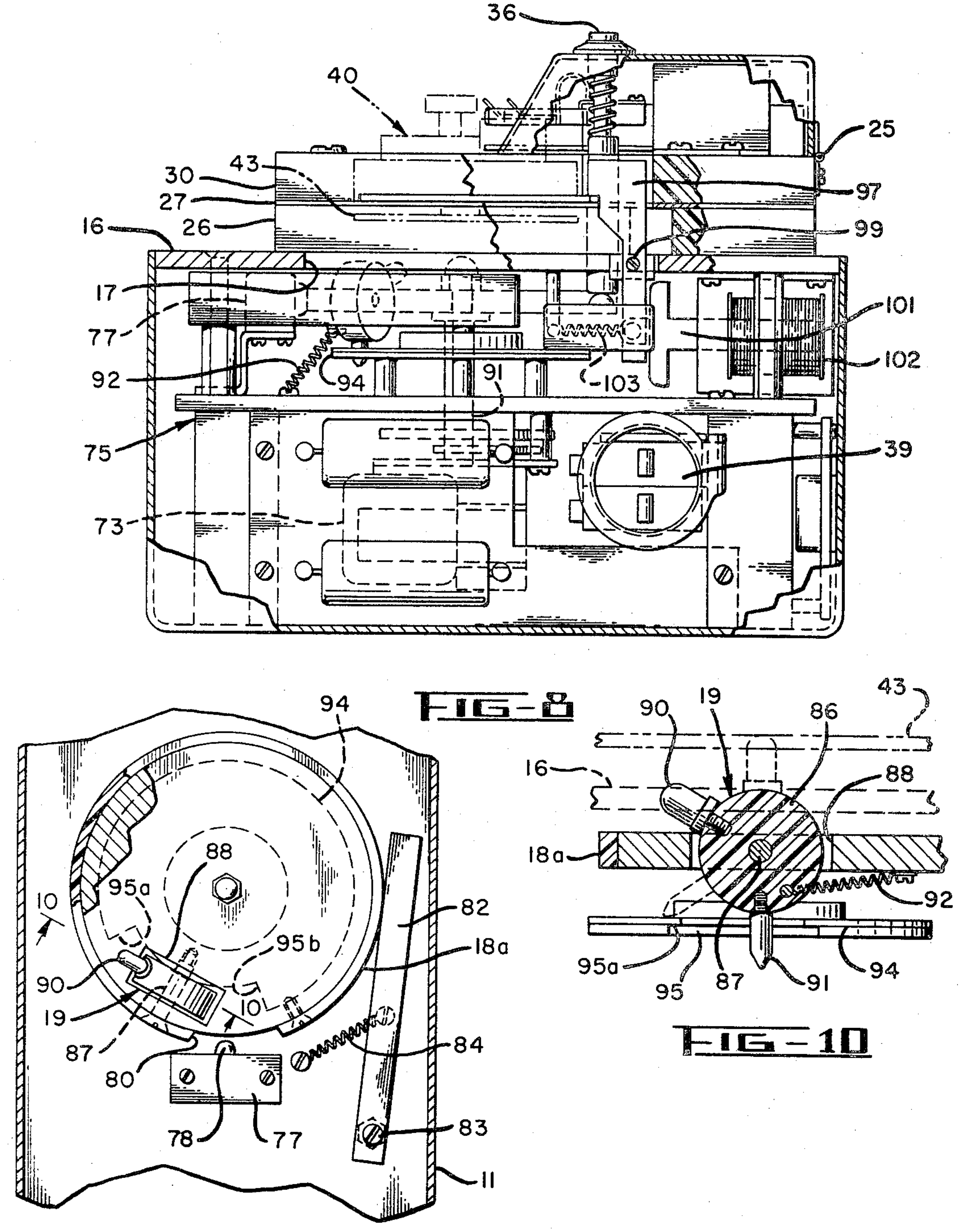
FIGURE 8 is a side elevation of the fixture as viewed on line 8—8 of FIGURE 6 with the side wall broken away to show the internal construction and illustrating in broken line the relative position of the dial in the test position.
FIGURE 9 is a horizontal section taken on line 9—9 of FIGURE 7 showing the finger wheel engaging and rotating mechanism.
FIGURE 10 is an enlarged section taken on line 10—10 of FIGURE 9 showing the crank which engages the finger wheel.

Referring now to FIGURES 6, 7, and 8, the terminal fingers 23 are arranged to engage the respective terminals on the dial when the latter is in the test position within the fixture. The terminal fingers are identified as the double prime of the reference characters for the corresponding dial terminal contacted by the fingers and are mounted on a block 66 (see FIGURE 7) which removably plugs into a receptacle, not shown, on the top of guide block 30. L-shaped finger 67 shown at the left in FIGURE 6 engages and makes electrical contact with finger 61″ when the dial is in test position within the fixture. Beveled guide bars 68 and 69 engage opposite sides of the U-shaped support 65 of dial terminal block 64 to insure proper orientation of the dial within the fixture.

Dial spin plate 18, see FIGURE 7, is mounted on a vertical shaft 71 driven through gears 72 by a motor 73 secured to a motor support frame 74 on a base support 75 within housing 11. Motor 73 is energized through actuation of start button 36 and causes spin plate 18 to rotate through 360°. Control of the motor to limit rotary movement of spin plate 18 to one revolution is provided by a motor control switch 77 supported on top wall 16 adjacent to the periphery of spin plate 18 as shown in FIGURES 6 and 9. The switch is opened and closed by an actuating button 78 which is depressed (closed) by engagement with the periphery **18*a* of plate 18 and opens when the notch 80 in the periphery 18*a* is opposite the button. In order to further control the extent of rotary movement of plate 18, a brake bar 82 pivoted at 83 on top wall 16 is urged by spring 84 against the periphery of spin plate 18. Surface wear of this spin plate and undue torque on the motor are limited by provision of a band of anti-friction material, such as Teflon, on the plate periphery, the ends of this band being spaced to form the notch 80.**

Finger wheel engaging crank 19, see FIGURES 9 and 10, comprises a disc 86, preferably made of synthetic material, mounted for rotation about a pin 87 within a rectangular opening 88 in plate 18 near the peripheral edge thereof. Arms 90 and 91 extend outwardly from disc 86 above and below plate 18, respectively, perpendicular to pivot pin 87 and at an acute angle to each other. Spring 92 connected between disc 86 and spin plate 18 biases the disc so that arm 91 extends vertically downward and arm 90 is inclined to an inoperative position shown in solid lines in FIGURE 10. A stationary horizontal cam plate 94 mounted on base support 75 directly below crank disc 86 has a generally circular periphery interrupted by a notch 95 through which crank arm 91 on disc 86 extends at the beginning and end of each cycle.

As spin plate 18 rotates, crank arm 91 engages and rides up on the top surface of cam plate 94 causing crank arm 90 to move to the vertical or finger wheel engaging position as shown in broken lines in FIGURE 10. Crank arm 90 remains in this position for approximately 140° of rotation of the spin plate 18 and snaps out of engagement with the finger wheel under the biasing tension of spring 92 when the crank arm 91 again drops into notch 95 of cam plate 94.

By adjustment of the tension on brake bar spring 84, the angular spacing of the crank 19 beyond the trailing edge **95*a* and ahead of leading edge 95*b* of notch 95 is predetermined and limited so that the crank comes to rest over the notch and out of operative engagement with the finger wheel of the dial. These edges of the notch are angularly related to the fixture so that crank arm 90 engages the "zero" finger opening 44*a* (see FIGURE 5) of the dial wheel near the start of the cycle and releases it when that finger opening is immediately adjacent to finger stop 45.** Thus the dial wheel is fully wound by the action and, when released, rolls back to its original position.

The dial eject mechanism comprises a lever 97, see FIGURES 7 and 8, pivoted within a slot 98 in top wall 16 of the base to the rear of the circular opening 17 by a pin 99. The lower part of the lever is operably connected to an arm 101 of a solenoid 102 which is biased to the extended or forward position (to the left as shown in FIGURE 8) by a spring 103. The upper end of the lever is adjacent to the casing of a dial when the latter is in the test position in the fixture and forcibly presses against the casing when the solenoid is actuated to eject the dial from the fixture. The solenoid is energized when button 37 is depressed.

Figure 11:
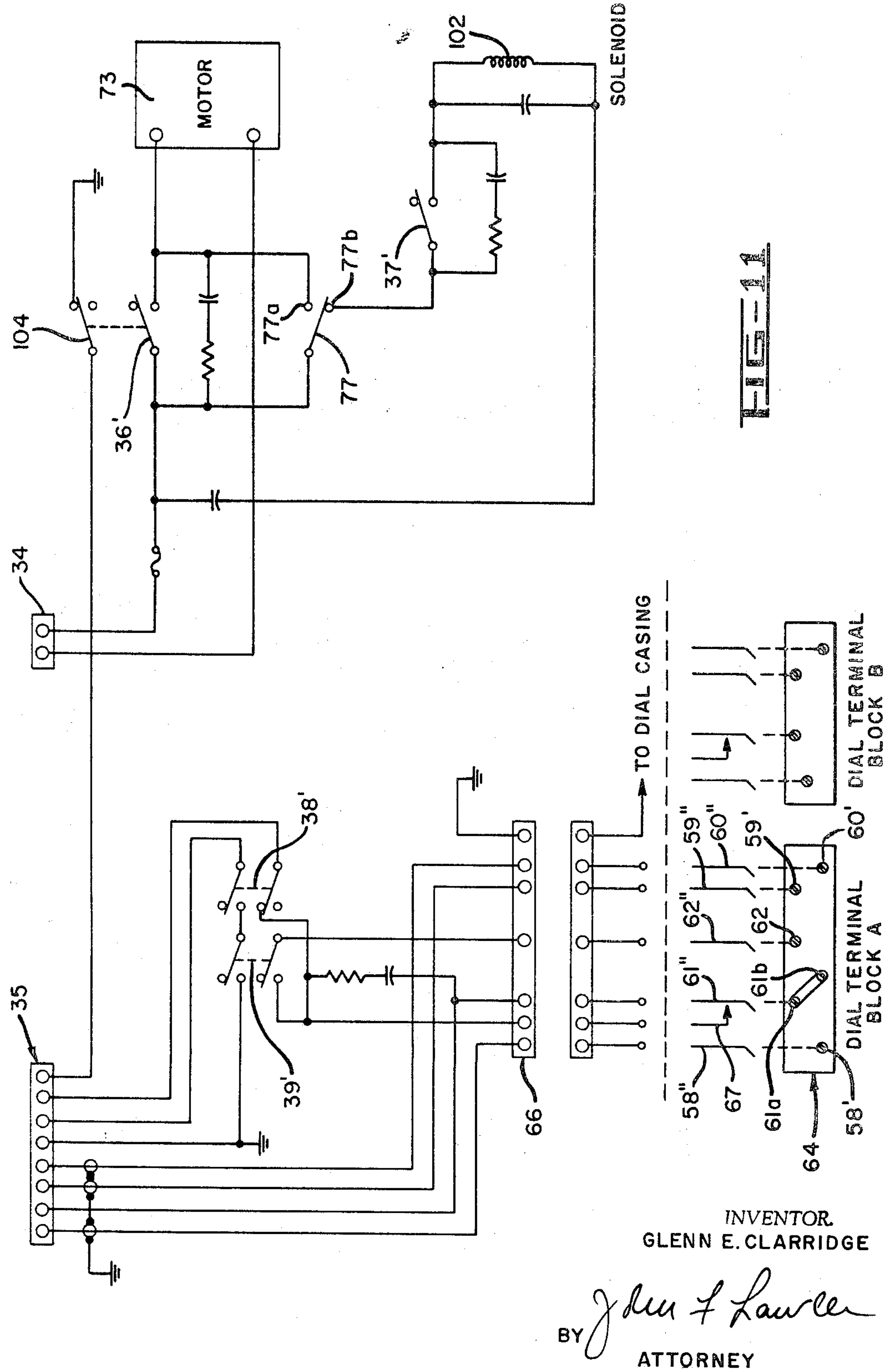
FIGURE 11 is a schematic wiring diagram of the windup fixture.

A schematic wiring diagram of the automatic windup fixture is shown in FIGURE 11. Power from a 110 volt 60 cycle source is connected via plug 34 to the drive motor 73 through start switch 36' operated by the start button 36. Another switch 104 operated by start button 36 serves to ground and reset external circuits in associated readout equipment. The normally open contact **77*a* of hold-in switch 77 is closed when the periphery of the rotating dial spin plate 18 engages switch button 78 and remains closed to supply power to motor 73 after start button 36 is released. Thus continued energization of motor 73 is under the control of switch 77 which in turn is controlled by the angular displacement of the spin plate. Power from plug 34 is applied to solenoid control switch 37' through hold-in switch contact 77*b* and therefore the solenoid may not be energized while motor 73 is operating. Switches 38' and 39' which are actuated by high voltage test buttons 38 and 39 are series-connected and are effective, when actuated simultaneously, to so connect an external 500 volt DC source to the appropriate pins on terminal block 35 for checking the effectiveness of insulation in the dial and other aspects of its construction. As indicated in the wiring diagram, the circuit can accommodate different types of dials represented by terminal block A and terminal block B, and for this purpose terminal finger block 66** is a plugable unit that may be replaced.

Changes, modifications, and improvements may be made to the above-described dial windup unit without departing from the spirit of the invention. The claims define the essential features of novelty of the invention.

I claim:

1. An automatic windup fixture for a telephone dial having electrical terminals on one side and a finger wheel on the other, comprising a holder for releasably supporting the dial in a test position, a plurality of terminal members engageable with the electrical terminals, respectively, of the dial when the dial is in the test position, a dial wheel spin mechanism adjacent to said holder comprising a crank supported for rotation about an axis and having an arm movable between an operative position and an inoperative position, a motor operatively connected to said crank for rotating same about said axis, means for initiating energization of said motor, a motor control switch responsive to angular displacement of said crank about said axis to limit energization of the motor to one revolution of said crank about said axis, and means for actuating movement of said crank between the operative and inoperative positions at predetermined angular displacements thereof about said axis whereby to wind and release the wheel of the dial when in the test position.

2. The fixture according to claim 1 with a spin plate mechanically coupled to said motor and supporting said crank for rotation about said axis on a radius equal to the radial spacing of a dial wheel finger hole from the dial spin axis, said plate being engageable with the motor control switch for operating the motor.

3. The fixture according to claim 2 with a stationary cam plate supported adjacent to the spin plate for engagement with the crank when the spin plate rotates whereby to move the crank between said operative and inoperative positions.

4. The fixture according to claim 3 in which said crank has two arms extending on opposite sides, respectively, of said spin plate, one of said arms being engageable with said cam plate and the other of said arms being engageable with the finger wheel of the dial under test.

5. The fixture according to claim 1 in which said holder has a U-shaped configuration for receiving and frictionally retaining the dial in the test position, an eject lever mounted adjacent to the holder for engagement with the dial in said test position, and electrical means for rocking said lever to eject the dial from the holder.

6. The fixture according to claim 5 in which said last named means comprises a solenoid, and a switch for controlling energization of the solenoid, said solenoid switch being interconnected with said motor control switch so as to prevent energization of the solenoid during windup of the dial wheel.

No references cited.

KATHLEEN H. CLAFFY, *Primary Examiner.*

A. A. McGILL, *Assistant Examiner.*